United States Patent [19]

Miyazaki

[11] Patent Number: 4,891,696

[45] Date of Patent: Jan. 2, 1990

[54] ELECTRONIC ENDOSCOPE APPARATUS PROVIDED WITH IMAGE FORMING POSITION DETECTING MEANS

[75] Inventor: Akihiko Miyazaki, Hachioji, Japan

[73] Assignee: Olympus Optical Co., Ltd., Tokyo, Japan

[21] Appl. No.: 296,097

[22] Filed: Jan. 12, 1989

[30] Foreign Application Priority Data

Apr. 7, 1988 [JP] Japan .................................. 63-86376
Nov. 21, 1988 [JP] Japan .................................. 63-294227

[51] Int. Cl.⁴ ............................ A61B 1/04; H04N 7/18
[52] U.S. Cl. ........................................ 358/98; 358/160; 128/6
[58] Field of Search ...................... 358/48, 160; 128/4, 128/6

[56] References Cited

U.S. PATENT DOCUMENTS 4,621,284 11/1986 Nishioka et al. ...................... 358/98
4,656,508 4/1987 Yokota ................................... 358/98

Primary Examiner—James J. Groody
Assistant Examiner—Victor R. Kostak
Attorney, Agent, or Firm—Armstrong, Nikaido, Marmelstein, Kubovcik & Murray

[57] ABSTRACT

An optical image transmitted by an image transmitting member of a fiber scope is photoelectrically converted by an imaging device, is passed through a signal processing circuit and is displayed in a predetermined displaying position on a displaying picture surface. The range of the image imaged by the imaging device from the output signal from an imaging unit fitted with an image guide transmitting member on the exit end surface and containing the imaging device is detected, the value of the center position of the range is determined and the displaying position is corrected in response to the value.

25 Claims, 12 Drawing Sheets

FIG. 5
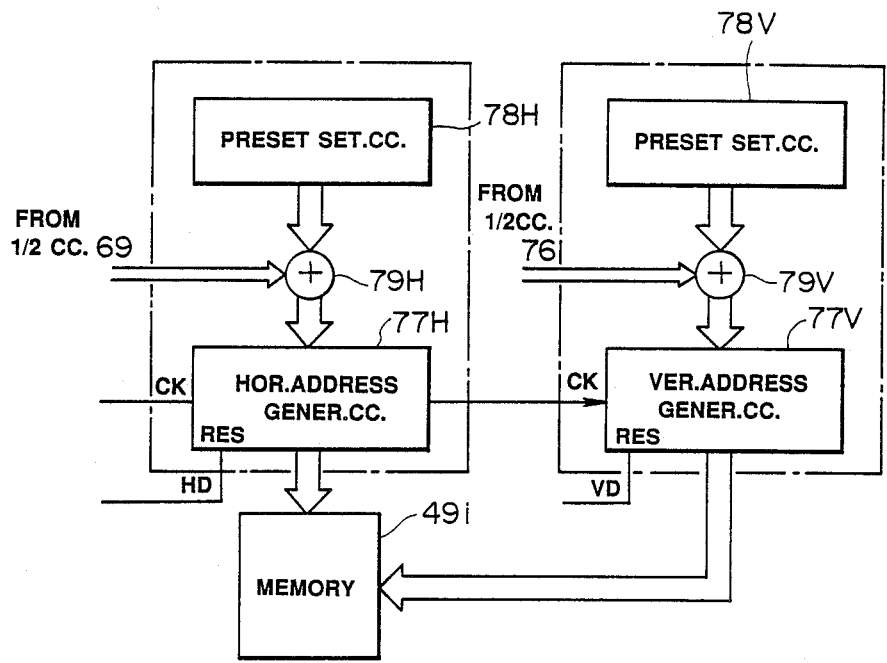
FIG. 6a
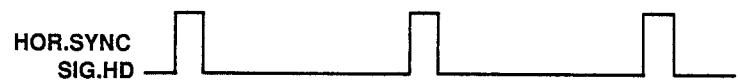
HOR.SYNC SIG.HD
FIG. 6b
OUTPUT OF MOR.ADR.GEN.77H
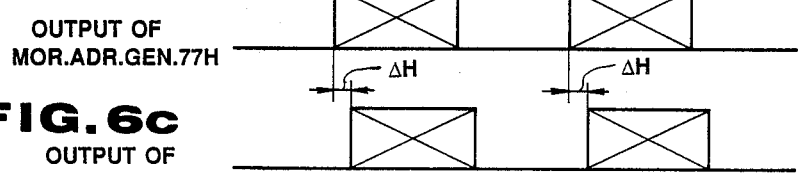
FIG. 6c
OUTPUT OF MOR.ADR.GEN.77H

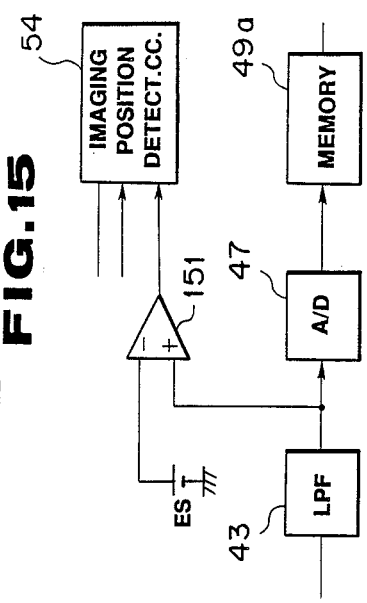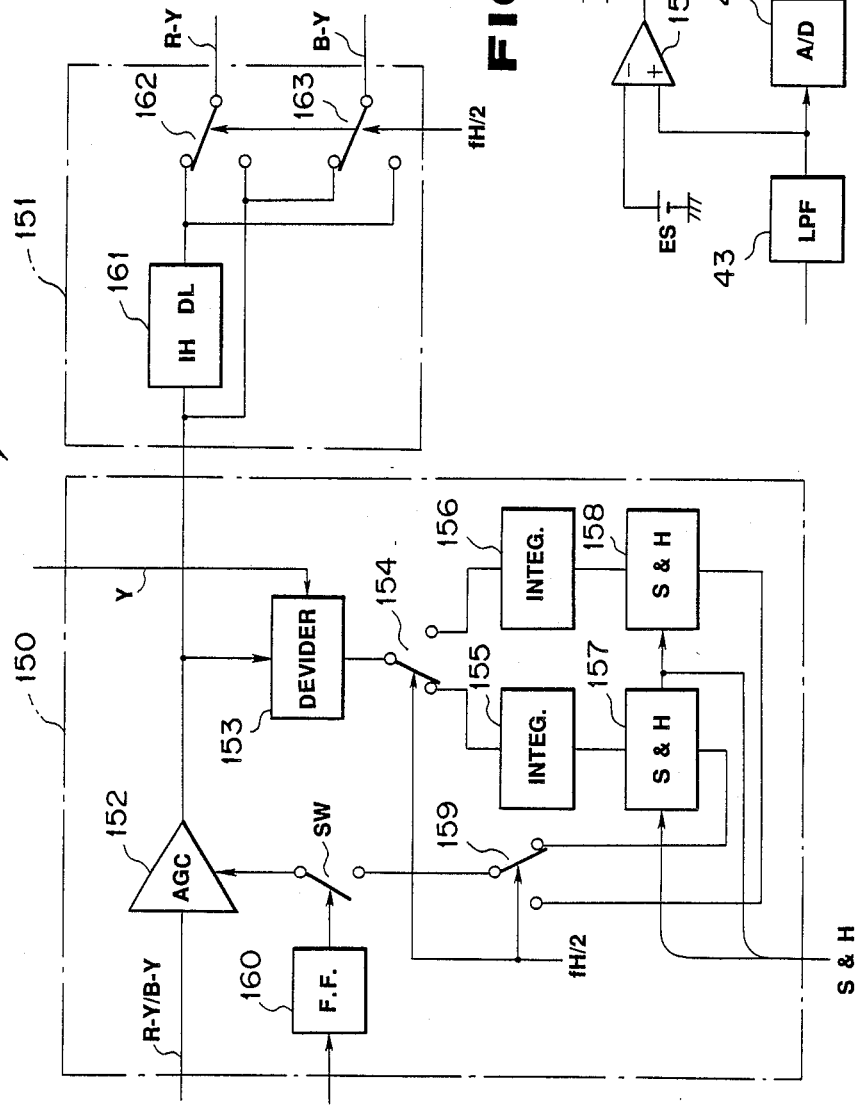

ELECTRONIC ENDOSCOPE APPARATUS PROVIDED WITH IMAGE FORMING POSITION DETECTING MEANS

BACKGROUND OF THE INVENTION

Field of the Invention and Relates Art Statement

This invention relates to an electronic endoscope apparatus wherein a picture image displayed in a monitor is positioned on the basis of an output signal of a solid state imaging device.

An electronic endoscope using a solid state imaging device, such as a CCD, for an imaging means has recently come to be used. Such an electronic endoscope contains a solid state imaging device in the tip part of an insertable part or is fitted with a television camera containing a solid state imaging device in an optical endoscope (such as, for example, a fiber scope).

In the latter, an optical image transmitted by an image guide within the fiber scope is formed on the imaging surface of the solid state imaging device by an image forming lens system within the television camera. However, the optical axis (on the exit end side of the image guide) of the fiber scope and the optical axis of the image forming lens system on the television camera side will be displayed from each other when fitted.

When the above mentioned displacement is produced, the center position of the picture image displayed on the monitor picture surface will be displaced from a predetermined position to be displayed and also from the center position of the image guide.

In order to eliminate such a displacement, the image forming lens system has conventionally been mechanically adjusted.

Particularly, in a vein fiber scope in which the image guide is fine, the optical axis adjustment with the solid state imaging device is required to be precise and the mechanical adjustment has been difficult. Also, it has been difficult to mechanically correct the displacement of the optical axes. Therefore, in a monitor observation, the image of an object will be displaced from a predetermined position.

When an endoscope picture image is to be displayed as large as possible on a monitor picture surface, if the displaying position is displaced, the displayed picture image will be partly missing.

Also, when the picture image displayed on the monitor picture surface is to be photographed, if the displaying position is displaced, the photographed picture image may be partly missing.

OBJECTS AND SUMMARY OF THE INVENTION

An object of the present invention is to provide an electronic endoscope apparatus the center on the fiber scope side can be displayed correctly in a predetermined position on a monitor picture surface without requiring a mechanical optical axis adjusting operation.

Another object of the present invention is to provide an electronic endoscope apparatus which can be used with little adjustment and is easy to use.

In a conceptional view of the present invention shown in FIG. 1, an illuminating light by a light source apparatus 1 illuminates a white object 4 through a light guide 3 of a fiber scope 2. The image of this object 4 is formed as an optical image on the entrance end surface of an image guide 7 by an observing optical system 5 of the fiber scope 2 and is transmitted to the exit end surface. This image guide 7 is connected at the exit end to an imaging section 9, for example, of a video processor apparatus 8. The optical image at this exist end is formed by an image forming lens 11 on a CCD 12 arranged in the focal plane of the image forming lens 11. The signal photoelectrically converted by this CCD 12 is input into a signal processing section 13 and also into an image forming center position detecting section 14. The center position in the image of the object formed on the imaging surface of the CCD 12 is sensed by this position detecting section 14. By this sensing output, the timing or the like of the video signal output by the correction of the reading-out address of a memory is corrected in the signal processing section and the above mentioned center position is displayed so as to be a predetermined position on the displaying picture surface 16 of a monitor 15.

BRIEF DESCRIPTION OF THE DRAWINGS

FIGS. 2 to 6 relates to the first embodiment of the present invention.

FIG. 2 is an explanatory view showing an image region formed on an imaging surface of a CCD.

FIG. 3 is a formation view of the first embodiment.

FIG. 4 is a block diagram showing the formation of an image forming position detecting circuit.

FIG. 5 is a block diagram showing the formation of an address correcting circuit as a displaying position correcting means.

FIGS. 6a–6b are waveforms explaining view of FIG. 5.

FIG. 12 is a block diagram showing an example of a white balancing circuit.

FIG. 15 is a block diagram showing a means of producing a signal for detecting an image forming position.

DETAILED DESCRIPTION OF THE PREFERRED EMBODIMENTS

Figure 3:
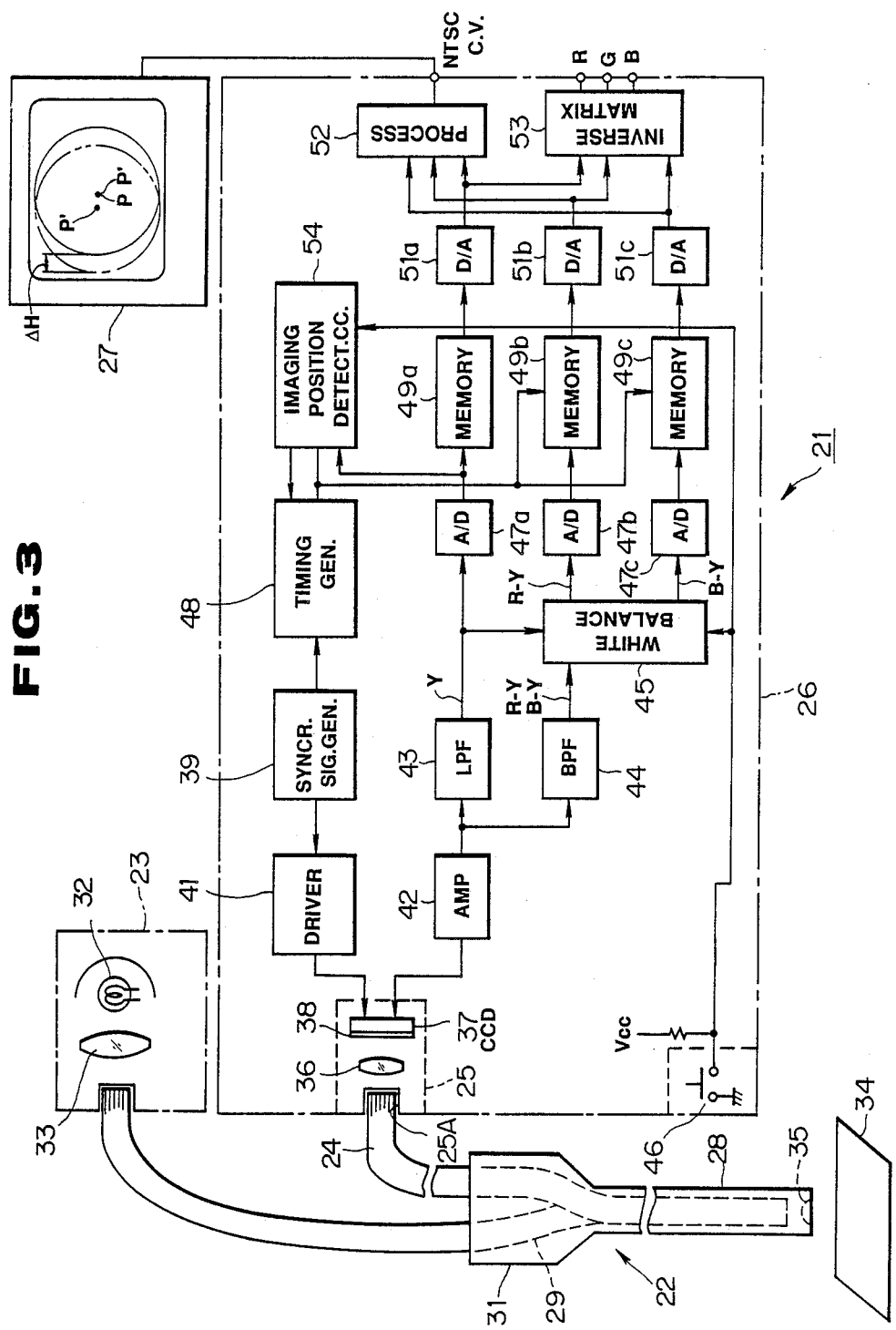

As shown in FIG. 3, an electronic endoscope apparatus 21 of the first embodiment comprises a fiber scope 22, a light source apparatus 23 feeding an illuminating light to this fiber scope 22, a video processor apparatus 26 imaging in an imaging section an optical image transmitted by an image guide 24 of the above mentioned fiber scope 22 and producing a predetermined video signal and a color monitor 27 displaying the video signal output from this video prodessor apparatus 26.

The above mentioned fiber scope 22 has an elongate flexible insertable part 28 through which is inserted a light guide 29 transmitting an illuminating light. This light guide 29 is extended out through a thick operating section 31 provided at the rear end of the insertable part 28 so as to be connectable at the end (entrance end) to the light source apparatus 23. A white color light of a lamp 32 is condensed by a condenser lens 33 and is fed to the light guide 29 on the entrance end surface. An object 34 to be imaged is illuminated with the white color light emitted from the exit end of this light guide 29.

The image of the illuminated object 34 is formed on the entrance end surface of the image guide 24 by an objective lens 35 fitted to the tip part of the insertable part 28. The optical image formed on the entrance end surface of this image guide 24 is transmitted to its exit end surface. This image guide 24 is inserted through the insertable part 28 and operating part 31, is further extended out of the operating part 31 and can be connected at the exit end to an image guide fitting part 25A provided in the imaging section 25 of the video processor apparatus 26. The optical image transmitted by this image guide 24 is formed on the imaging surface of a CCD 37 by an image forming lens 36. A mosaic filter 38 is fitted on the imaging surface of this CCD 37 to separate the colors of the optical image. A driving signal output from a (CCD) driver 41 at a timing synchronized with a synchronous signal output from a synchronous signal generating circuit 39 is applied to this CCD 37 and a photoelectrically converted signal is read out by the application of this driving signal. The signal read out of this CCD is amplified by an amplifier 42, is input into a low-pass filter 43 and band-pass filter 44 and is separated into a luminance signal Y, time serial (line sequential) color difference signals R−Y and B−Y. These line sequential color difference signals R−Y and B−Y are input into a white balancing circuit 45 in which, when a white balancing switch 46 is on, a signal to be "L" will be output and a white balancing function will occur. This white balancing circuit 45 is provided also with a function of synchronizing the line sequential color difference signals R−Y and B−Y and outputting the color difference signals R−Y and B−Y.

The above mentioned luminance signal Y and two color difference signals R−Y and B−Y are converted to digital signals respectively by A/D converters 47a, 47b and 47c and are written respectively into memories 49a, 49b and 49c by an address clock of a timing generating circuit 48. When signal data for one frame is written into these memories 49a, 49b and 49c, the signal data will be simultaneously read out and will be converted to analogue signals respectively by D/A converters 51a, 51b and 51c. These analogue signals Y, R−Y and B−Y are input into a processing circuit 52 and inverse matrix circuit 53, are converted respectively to a composite video signal of NTSC and three primary color signals of R, G and B and are color-displayed by the color monitor 27.

The digital luminance signal Y, converted by the above mentioned A/D converter 47a, is input into an image forming position detecting circuit 54 which, when the white balancing switch 46 is on, will detect the center position of the image forming position based on the signal output from the CCD 37 and will input to the timing generating circuit 48 an address signal corresponding to the center position. With this address signal, the timing generating circuit 48 corrects the timing of address clocks, read out of the memories 49a to 49c, and reads out the memories 49a to 49c using these corrected address clocks. By the correction of these read-out address clocks, even when the center of the exit end of the image guide 24 and the center of the image guide fitting part 25A or the center position of the imaging surface of the CD 37 are relatively displaced from each other, the center position of the image imaged by this CCD 37 will be able to coincide with a predetermined displaying position to make a color display.

Figure 4:
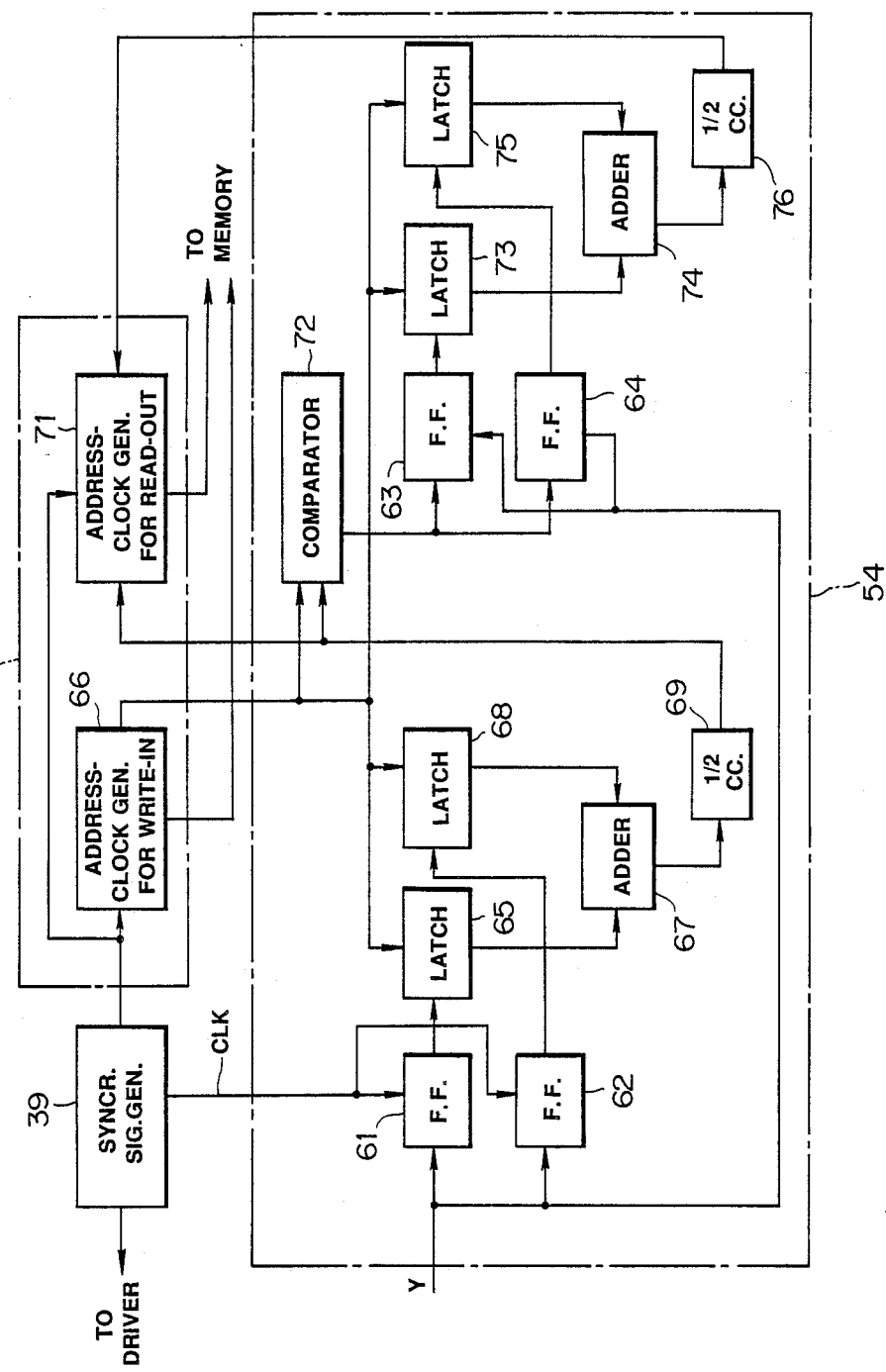

The detailed formations of the above mentioned image forming position detecting circuit 54 and timing generating circuit 48 are shown in FIG. 4.

A predetermined one bit part of the digital Y signal is input into the first to fourth flip-flops 61, 62, 63 and 64. The one bit in the U signal (for example O bits) input into the first to fourth flip-flops 61 to 64 is set to be a bit (for example, MSB) which will be "1" in the image forming section and "0" in the others than the image forming section when the white object 34 is imaged.

A clock CLK which becomes a position detection timing signal is input from the synchronous signal generating circuit 39 into the above mentioned first and second flip-flops 61 and 62. When the digital Y signal first becomes "1" from "0", for example, the first flip-flop 61 will output this signal in a latch circuit 65 and will latch an address clock (for example, m bits) in the vertical direction (of the writing-in address clock circuit 66) input into this latch circuit 65 at this timing. The latch circuit 65 will become inoperative, for example, after being once latched so as to latch only the data value when the digital Y signal first becomes "1" from "0".

This latched address value is input and held in an adding circuit 67.

When the digital Y signal finally becomes "0" from "1", the second flip-flop 62 will output the signal data to a latching circuit 68 and will latch the above mentioned address clock input into this latching circuit 68 at this timing. This latched address value is input into an adding circuit 67 and is added to the address value input from the latching circuit 65. These added respective address values represent a boundary in the vertical direction of the image. They are added and are then multiplied by ½ in a ½-circuit 69 and the address of the center of an image forming part in the vertical direction is detected. The output of the ½-circuit 69, representing the address of this center, is input into a reading-out address clock circuit 71 and also into a comparing circuit 72 to hold the data values.

The above mentioned reading-out address clock generating circuit 71 displaces the timing of the reading-out address clock produced from the clock of the synchronous signal generating circuit 39 by the signal data part representing the address of the center output from the ½-circuit 69. That is to say, by making a correction of displacing this address, the signal read out of the memory by the corrected read-out address has the center of its image forming position coincide with a predetermined displaying position on the displaying picture surface of the color monitor 27.

Thus, the address of the center in the vertical direction is determined and then the address of the center in the horizontal direction is set.

That is to say, in the comparing circuit 72 holding the address of the above mentioned center, in the next field or frame, when the address value of this center and the address clock output from the writing-in address clock circuit 66 coincide with each other, the third and fourth flip-flops 63 and 64 will be operative. During the horizontal read-out period in the center position in the vertical direction, when the digital Y signal becomes "1" from "0", the flip-flop 63 will be set, the horizontal address of the writing-in address clock circuit 66 will be latched by the latching circuit 73 at this timing and the address value is input into the adding circuit 74. During the horizontal read-out period in the address position of the center in the vertical direction, when the digital Y signal first becomes "0" from "1", the fourth flip-flop 64 will be set and the horizontal write-in address will be latched by the latching circuit 75 at this timing. The address value latched by this latching circuit 75 is input into the adding circuit 74 and is added to the address value of the above mentioned latching circuit 73. These two address values, represent the address of the boundary part in the horizontal direction of the image, are added in the adding circuit 74 and are then multiplied by $\frac{1}{2}$ in the $\frac{1}{2}$-circuit 76 to detect the address of the center of the image in the horizontal direction. This address is input into the reading-out clock circuit 71 to correct the read-out address in the horizontal direction (for example, to correct the read-out address by the preset value).

Using the read-out address corrected by the address values of the images in the vertical direction and horizontal direction output from the above mentioned $\frac{1}{2}$-circuits 69 and 76, the signal read out of the memory will be displayed with the center position of the image set in a predetermined position on the monitor picture surface. When the switch 46 is on, for example, when the first to fourth flip-flops 61 to 64 are set to be operative, this image forming position detecting circuit 54 will be operate.

The operation of this first embodiment shall be explained in the following with reference to FIG. 2.

Figure 1:
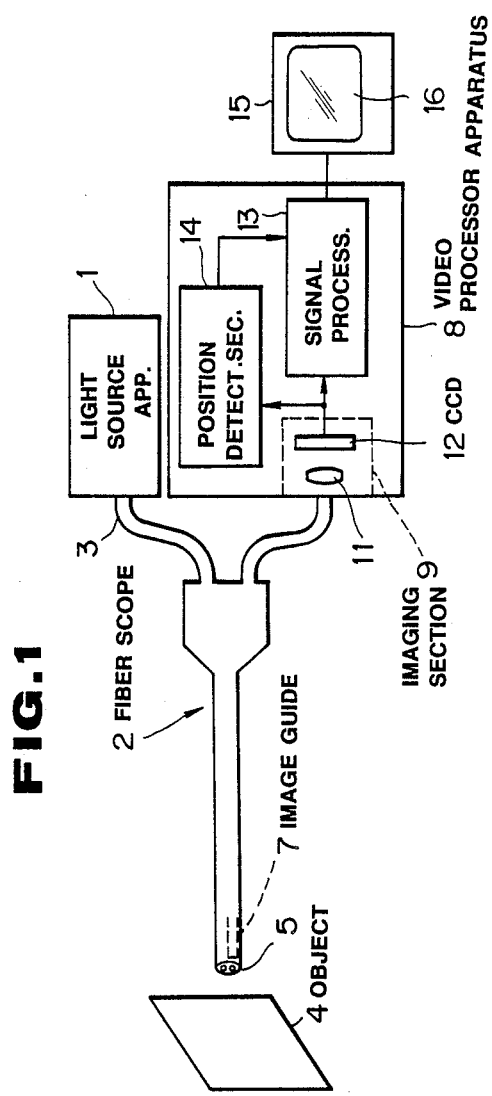
FIG. 1 is a conceptional view showing the basic formation of the present invention.
Figure 2:
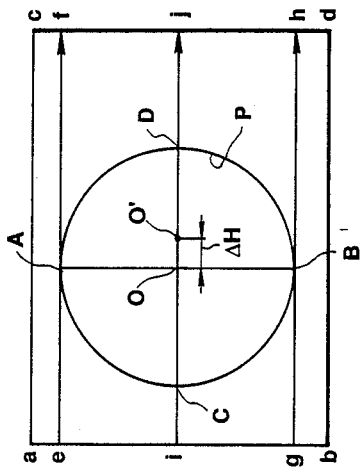

FIG. 2 shows an imaging surface of the CCD 37 when the white object 34 is imaged. In FIG. 2, the four corners of the imaging surface are represented by a, b, c and d. For example, the image of the exit end surface of the image guide 24 is formed to be circular. This circular image P becomes white. In such a case, the center O of the image P formed as displaced from the center O' of the imaging surface.

This CCD 37 is read out in the horizontal direction, for example, in a→c and is read out finally as in b→d.

When the digital Y signal is input into the respective data input ends of the flip-flops 61 and 62 and is read out in e→f in FIG. 2, (1 bit of) this Y signal will become "1" from "0" in the part A in contact with the image P and the write-in address value of m bits input into the latching circuit 65, at this timing, will be latched. Also, in FIG. 2, when read out in g→h, the Y signal will become "0" from "1" in the part B in contact with the image P, the flip-flop 62 will be set at this timing and the latching circuit 68 will latch the write-in address at this timing and will input it into the adding circuit 67. The two address values input into this adding circuit 67 are added, are then input into the $\frac{1}{2}$-circuit and are multiplied by $\frac{1}{2}$ and the center position of a line segment AB in FIG. 2, that is, the center address in the vertical direction in the image range is determined.

This center address is held in a comparing circuit 72. In the next field, when the write-in address reaches this value, that is, in the horizontal period in which the signal in i→j is being read out in FIG. 2, the comparing circuit 72 will keep the flip-flops 63 and 64 operative. In this horizontal period, when the boundary C of the image is reached, the flip-flop 63 will become "1" from "0", the latching circuit 73 will latch the write-in address and will output it to the adding circuit 74. In the flip-flop 64, when the boundary D of the image is reached, the Y signal will become "0" from "1" and therefore, at this timing, the address will be latched by the latching circuit 75. This latched address value is added to the address value of the latching circuit 73 in the adding circuit 74 and is further multiplied by $\frac{1}{2}$ in the $\frac{1}{2}$-circuit 76 to detect the center address in the horizontal direction in the image.

The above mentioned center addresses in the vertical direction and horizontal direction are input into the reading-out address clock circuit 71 to correct the read-out address. When the center position of the image is displayed in the color monitor 27 by this correction, it will be corrected to coincide with a predetermined position. For example, in FIG. 2, when the position displaced by ΔH in the horizontal direction from the center O' of the imaging surface becomes the center O of the image, the horizontal read-out clock applied to the memories 49a, 49b and 49c from the reading-out circuit 71 will be output as delayed by the number of pixels corresponding to ΔH for the horizontal synchronous signal.

On the hand, when the position is displaced also in the vertical direction, in the same manner, the timing at which the read-out clock in the vertical direction is applied, may be shifted for the vertical synchronous signal.

As shown, for example, in FIG. 5, this address correction is made by correcting preset data applied to a presetting terminal of a horizontal address generating circuit 77H (formed of a counter) outputting a horizontal address to a memory 49i (i representing a, b and c).

A presetting circuit 78 outputs standard preset data. These preset data are added to the output data of the above mentioned $\frac{1}{2}$-circuit 69 by an adder 79H and corrected preset data is applied to the presetting terminal of the horizontal address generating circuit 77H. In this horizontal address generating circuit 77H, the counted output of a clock CK is shifted by the amount of the preset data applied to the presetting terminal, For example, as shown in FIG. 6a, a horizontal synchronous signal HD is set and preset data is set at its rear edge. Due to these preset data, the horizontal address outputs of the horizontal address generating circuit 77H are applied to the memories 49i as delayed by the number of clocks of the preset data.

For example, when the output of the $\frac{1}{2}$-circuit 69 is made zero, as in FIG. 6b, the horizontal address clock will be applied to the memory 49i as delayed by the number of clocks of the preset data by the presetting circuit 78H. In such a case, the picture image data read out of the memory 49i will be displayed by a two-point chain line on the displaying picture surface of the monitor in FIG. 3. In this case, the center P' of the displayed picture image will be generally displaced from the normal displayed position P (displayed center position).

On the other hand, when there is output data of the $\frac{1}{2}$-circuit 69, as shown in FIG. 6c, a horizontal address clock further delayed by the number of clocks of Δ will be applied to the memory 49i. Therefore, the picture image data read out of the memory 49i will be displayed with the center P of the normal displaying position and the center position P' of the actually displayed picture image coinciding with each other as shown by the solid line on the displaying picture surface of the monitor 27 in FIG. 3.

The formation of the address correcting means for the vertical direction is the same as in the horizontal direction and is shown by attaching "V" instead of "H".

According to this first embodiment, even if a relative displacement is produced between the exit end of the image guide 24 and the image guide fitting part 25A of the imaging section 25 to which this exit end is connected, by changing the read-out address of the memory by the signal processing system, as the correcting means displaying in a predetermined displaying position is formed, the image imaged in the predetermined displaying position will be able to be correctly displayed.

Figure 7:
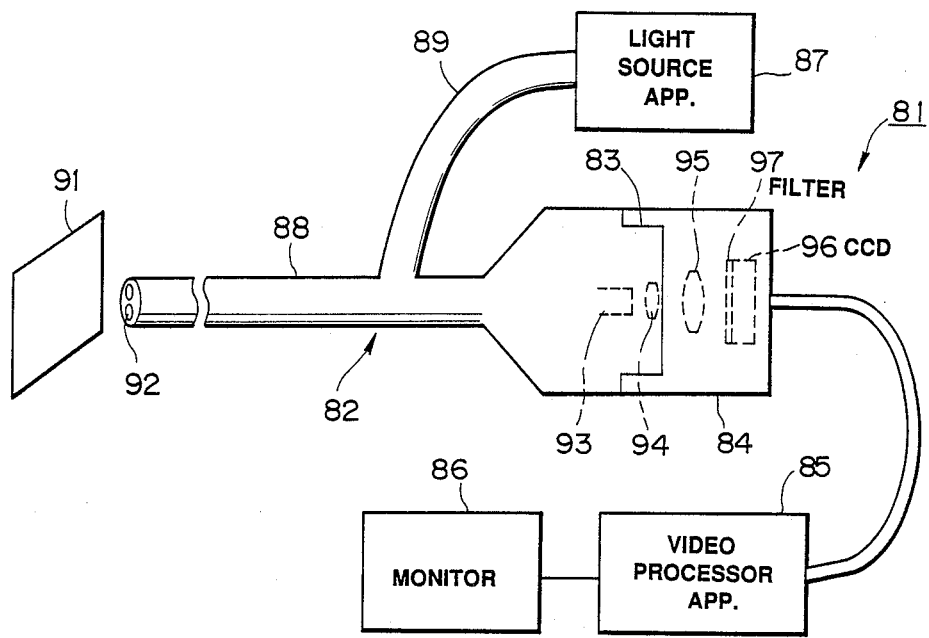
FIG. 7 is a general formation view of the second embodiment of the present invention.

FIG. 7 shows an electronic endoscope apparatus 81 of the second embodiment of the present invention.

This electronic endoscope apparatus 81 comprises a fiber scope 82, a TV camera fitted to the eyepiece part 83 of this fiber scope 82, a video processor apparatus 85 into which a signal imaged by this TV camera 84 is to be input, a monitor 86 displaying a video signal output from this video processor apparatus 85 and a light source apparatus 87 feeding an illuminating light to the above mentioned fiber scope 82.

A light guide 89, inserted through an insertable part 88 of the above mentioned fiber scope 82, is extended out on the entrance end side and is connected at the entrance end to the light source apparatus 87 to feed a white color light. The image of an illuminated object 91 (which is a white object in this case) is formed on the entrance end surface of the image guide 93 by an objective lens 92 fitted to the tip part of the insertable part 88. An optical image formed by this image guide 93 is transmitted to the exit end surface and is observable with a naked eye through an eyepiece lens 94. By connecting the TV camera 84, the image can be formed on a CCD 96 through an image forming lens 95. A mosaic color filter 97 is fitted on the front surface of this CCD 96 to separate colors. The light source apparatus 87 is of the same formation as the light source apparatus 23 shown in FIG. 3.

The formation of the above mentioned video processor apparatus 85 is the same as the formation which has no imaging section 25 in FIG. 3.

The operation and effects of this second embodiment are the same as the above mentioned first embodiment.

Figure 8:
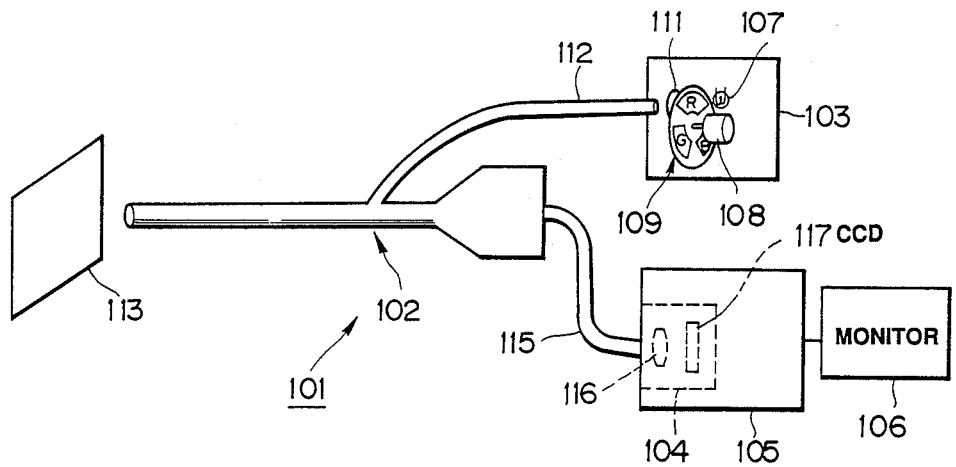
FIG. 8 is a general formation view of the third embodiment of the present invention.

FIG. 8 shows an endoscope apparatus 101 of the third embodiment of the present invention.

This endoscope apparatus 101 comprises a fiber scope 102, a frame sequential type light source apparatus 103 feeding an illuminating light to this fiber scope 102, a video processor apparatus 105 provided with an imaging section 104 imaging an optical image of this fiber scope 102 and a monitor 106 color-displaying the video signal output from this video processor apparatus 105.

Figure 9:
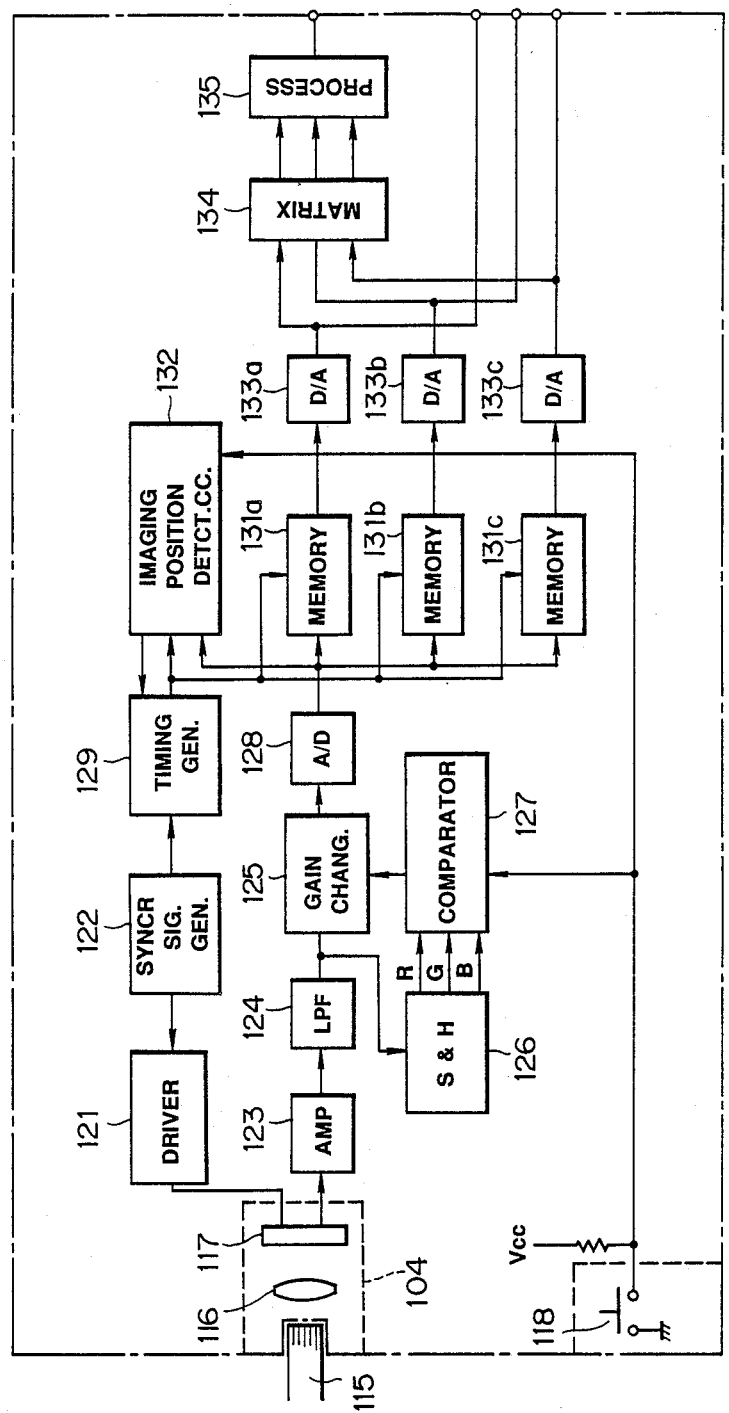
FIG. 9 is a block diagram showing the formation of a video processor apparatus in the third embodiment.

In the above mentioned light source apparatus 103, by passing a white color light of a white color lamp 107 through a rotary color filter 109 rotated by a motor 108, respective color transmitting filters of red (R), green (G) and blue (B) provided in this rotary color filter 109 are interposed successively into the light path, successive light of R, G and B are made, are condensed by a condenser lens 111, enter a light guide 112 on the entrance end surface, are transmitted through this light guide 112 and are emitted toward, for example, a white object 113. The image of this illuminated object 113 is formed by an objective lens and is transmitted to the exit end surface by an image guide 115. The optical image transmitted to this exit end surface can be fitted to an image fitting part of an imaging section 104 provided within a video processor apparatus 105. In case it is fitted, the image is formed on a CCD 117 by an image forming lens 116. As shown in FIG. 9, this video processor apparatus 105 is provided with a white balancing switch 118. When this switch 118 is operated, together with the white balance, the correction of the displaying position of the image displayed by the monitor 106 will work as operatively connected. Therefore, when this switch 118 is on, even if the image of the white object 113 is formed on the CCD 117 as displaced from the center position of the imaging surface of the CCD as shown, for example, in FIG. 2, by the above mentioned correction, the image will be displayed in the predetermined position on the displaying picture surface of the monitor 106.

The above mentioned video processor apparatus 105 has a signal processing system shown in FIG. 9.

A driving signal output from a driver 121 is applied to the CCD 117. By the application of this driving signal, a signal charge accumulated in each illuminating period is read out of the CCD 117. This read out will be made when the rotary filter 109, within the above mentioned light source apparatus 103, is in a light intercepting period. This driving circuit 121 produces a CCD driving signal on the basis of a synchronous signal output from a synchronous signal generating circuit 122. An R, G and B-sequential signal read out of the CCD 117 is amplified by an amplifier 123, is passed through an LPF 124 checking unnecessary higher harmonics and is then input into a gain switching circuit 125 and sample holding circuit 126. Then gain switching circuit 125 switches the gain for respective R, G and B signals in the R, G and B sequential signal to obtain a white balance. The sample holding circuit 126 sample-holds and synchronizes the respective R, G and B signal levels in the R, G and B sequential signal passed through the LPF 124 and outputs them to a comparing circuit 127. When the white balancing switch 118 is pushed, the comparing circuit 127 will become operative and the distribution of respective gains to the R, G and B sequential signal will be determined in a gain changing circuit 125 on the basis of the R, G and B signal levels output from the sample holding circuit 126. By the signal determining the gain distribution from this comparing circuit 127, the signal passed through the gain changing circuit 125 becomes a white balancing signal. This R, G and B sequential signal is converted to a digital signal by an A/D converter 128, is written into R, G and B memories 131a, 131b and 131c by an address clock from a timing generating circuit 129 and is input also into an image forming position detecting circuit 132.

The above mentioned image forming position detecting circuit 132 detects in what position of the CCD 117 the image is formed and inputs to the timing generating circuit 129 the address corresponding to the detected position. By the clock corrected by the timing generating circuit 129, the memories 131a to 131c are simultaneously read out. The signals read out of the memories 131a to 131c are converted to analogue signals respectively by D/A converters 133a, 133b and 133c, are output as R, G and B signals to the monitor side from the R, G and B output ends, are input into a matrix circuit 134 and are converted to a luminance signal Y and color difference signals R−Y and B−Y. These signals Y, R−Y and B−Y are input into a process circuit 135 and an NTSC composite video signal is produced and can be displayed on the monitor.

Figure 10:
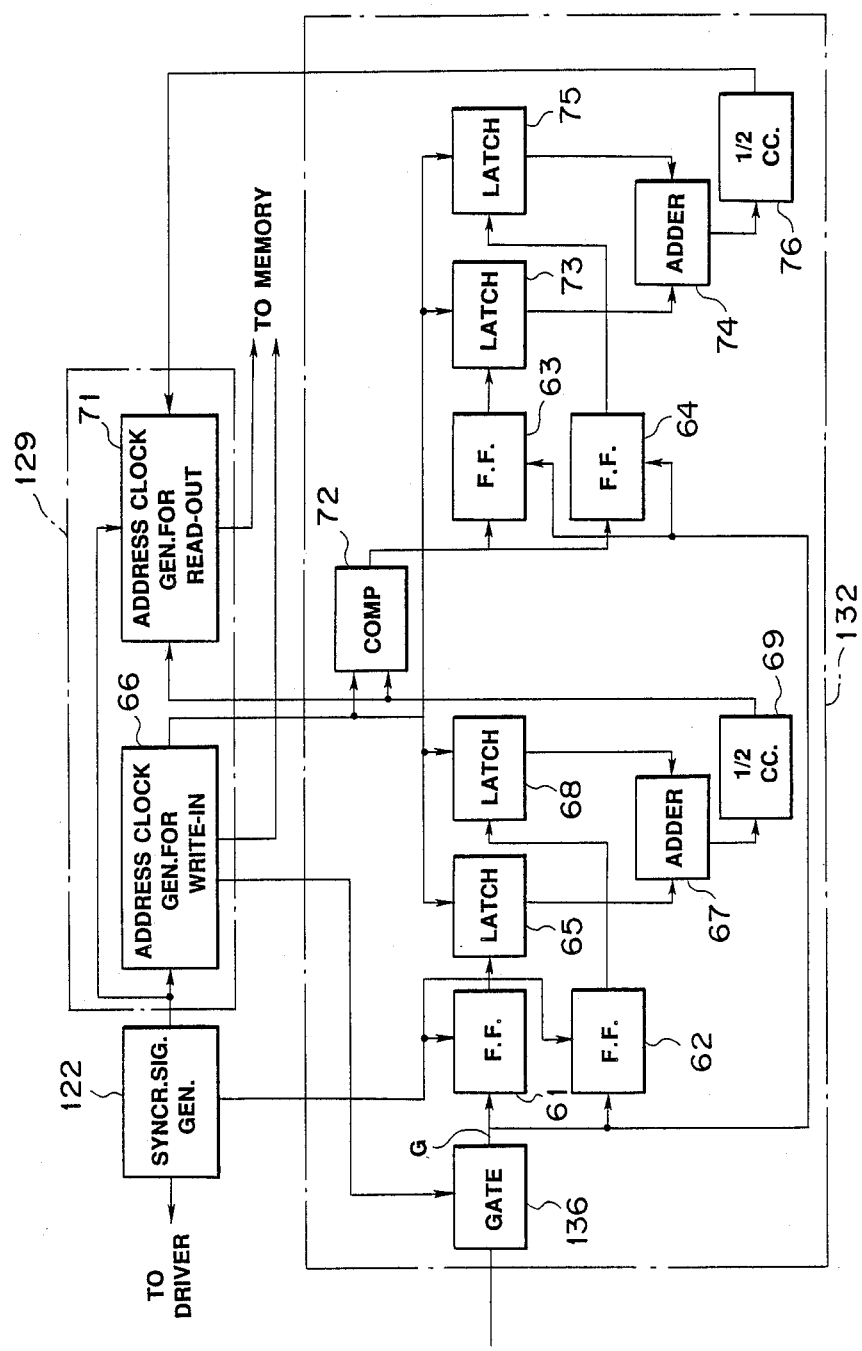
FIG. 10 is a block diagram showing the formation of an image forming position detecting circuit in the third embodiment.

The formation of the above mentioned image forming position detecting circuit 132 is shown in FIG. 10. In this formation, in the image forming position detecting circuit 52 shown in FIG. 4, a gate circuit 136 is provided on the input side of the flip-flops 61 and 62.

Of the digital R, G and B sequential signal from the A/D converter 128, only the digital G signal is passed by the control signal from the writing-in address clock circuit 66 in the gate circuit 136. As in the first embodiment, one bit of the digital G signal is input into the flip-flops 61 to 64. First, the address of the center of the image forming region in the vertical direction is detected. Then, as the R, G and B signals are a one-frame period, after one frame, the center of the image forming region in the horizontal direction is detected. In the reading-out address clock circuit 71, so that, after the address of the center of the image is detected in both horizontal direction and vertical direction, the center of the image may come to a predetermined position on the monitor, a read-out address clock is made and the image data from the memory are read out.

As in the above, the monitor image position is corrected within the video processor apparatus 105.

Figure 11:
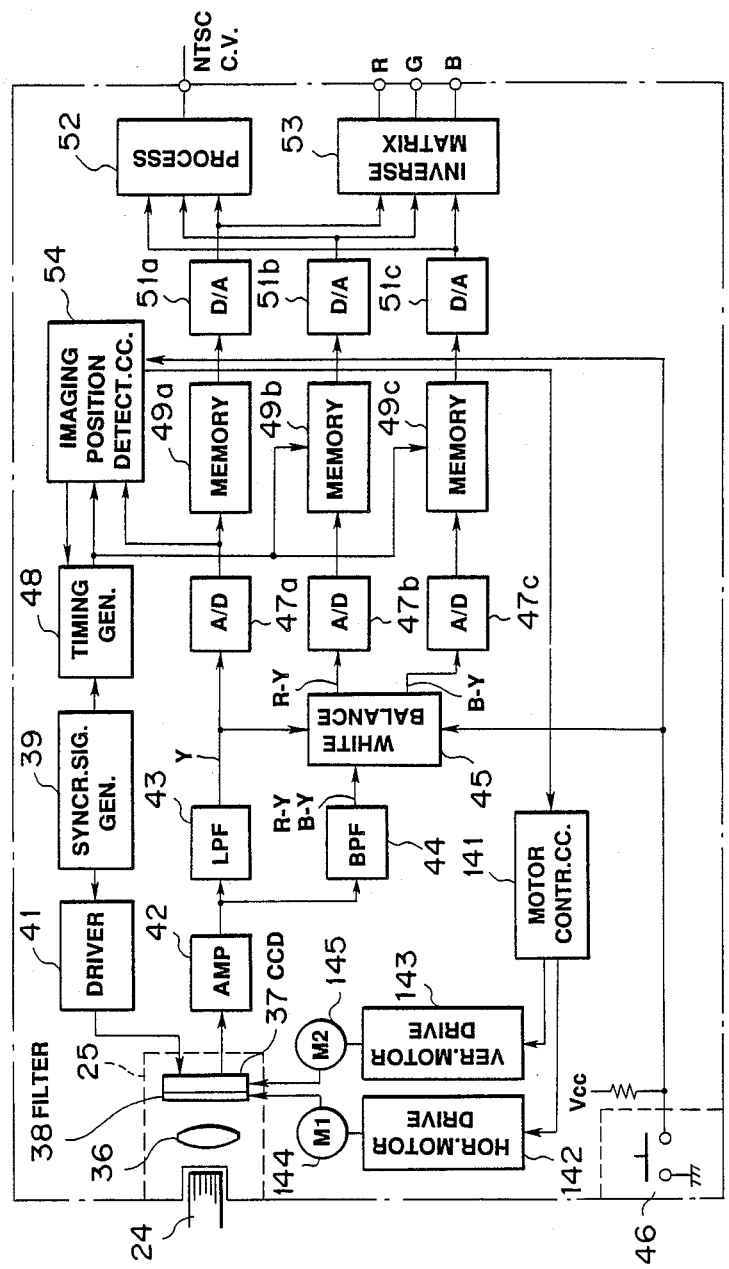
FIG. 11 is a block diagram showing the fourth embodiment of the present invention.

FIG. 11 shows the formation of the important parts in the fourth embodiment of the present invention.

In the above mentioned first to third embodiments, the displacement of the center of the formed image is detected and the memory is read out so that the center of the image may come to a predetermined position on the monitor. However, in this fourth embodiment, the center of the formed image is brought to the predetermined position on the CCD by moving the CCD itself.

In this embodiment, a CCD 37 having a mosaic filter 38 shall be explained. Therefore, in the formation shown in FIG. 3, the same components are shown by attaching the same reference numerals.

In this embodiment, the center address signal of an image detected by a formed image position detecting circuit 54 is output to a motor controlling circuit 141. For example, the center address of the formed image shall be h1 in the horizontal direction and v1 in the vertical direction. The motor controlling circuit 141 has these positions input thereto and moving signals are output to a horizontal motor driving circuit 142 and vertical motor driving circuit 143. For example, the center position of an image on the CCD 37 to be displayed inherently in a predetermined position on the picture surface of the monitor shall be h0 in the horizontal direction and v0 in the vertical direction. In the motor controlling circuit 141, the signals h1 and v1 input from the image forming position detecting circuit 54 and the above mentioned signals h0 and v0 are compared with each other. Error signals h0-h1 and v0-v1 are detected and are output to driving circuits 142 and 143 of the CCD 37 fitted to such apparatus as an X−Y stage. A horizontal motor 144 and vertical motor 145 are driven and the CCD 37 is moved in the horizontal direction and vertical direction by amounts proportional to the above mentioned error signals h0-h1 and v0-v1. By this movement, the CCD 37 becomes h0 in the position in the horizontal direction and v0 in the position in the vertical direction. Thus, by the movement of the CCD 37, the center of the formed image comes to a predetermined position of the CCD 37.

In this embodiment, the CCD 37 is moved. However, the lens 36 or image guide 24 may be moved in the same manner. The white balancing circuit 45, for example, in FIG. 3 and the white balancing part 150 and synchronizing circuit 151 shown, for example, in FIG. 12 can be used. Line sequential color difference signals R−Y and B−Y are passed through an AGC amplifier 152. The output of this AGC amplifier 152 is input into the synchronizing circuit 151 and into a dividing circuit. With this dividing circuit 153, the output signal of the AGC amplifier 152 is divided by the luminance signal Y and the output signal of this dividing circuit 153 is input into integrating circuit 155 and 156. The output signals of the respective integrating circuit 155 and 156 are input into respective sample holding circuits 157 and 158.

The output signals of the respective sample holding circuits 157 and 158 are applied to the AGC controlling end of the AGC amplifier 152 through switch 159 and SW and the gain of the AGC circuit 152 is controlled with the holding voltage of the sample holding circuits 157 and 158.

The above mentioned switches 154 and 159 are alternately switched at intervals of one horizontal period (abbreviated as 1H period). (This switching signal is represented by fH/2).

Therefore, the integrating circuits 155 and 156 integrate respectively the line sequential color difference signals R−Y and B−Y and respectively output average values signals. The respective average value signals are held by the sample holding circuits 157 and 185, the gain of the AGC circuit 152 are switched through the switch 159 at intervals of 1H period and white balancing line sequential color difference signals R−Y and B−Y are output to the synchronizing circuit 151 in the next step.

The switch SW is switched on and off by the output of the flip-flop 160 made "H" or "L" by the switch 46.

The dividing circuit 153 is for standardization with a luminance signal.

The synchronizing circuit 152 is formed of a 1H-delay device 161 and two operatively connected switches 162 and 163. By switching the operatively connected switches 162 and 163 with the switching signal fH/2 at intervals of 1H period, the synchronized color difference signals R−Y and B−Y are output.

In the above mentioned respective embodiments, the monitor image position or the image forming position of the CCD is corrected as operatively connected with the white balancing switch. However, a monitor image position correcting switch or a CCD image forming position correcting switch may be provided apart from the white balancing switch so that the position may be corrected independently of the white balancing. In such a, the object may not only be white but also may be a single color. Also, the light source apparatus and video processor apparatus may be integral with or separate from each other.

Figure 13:
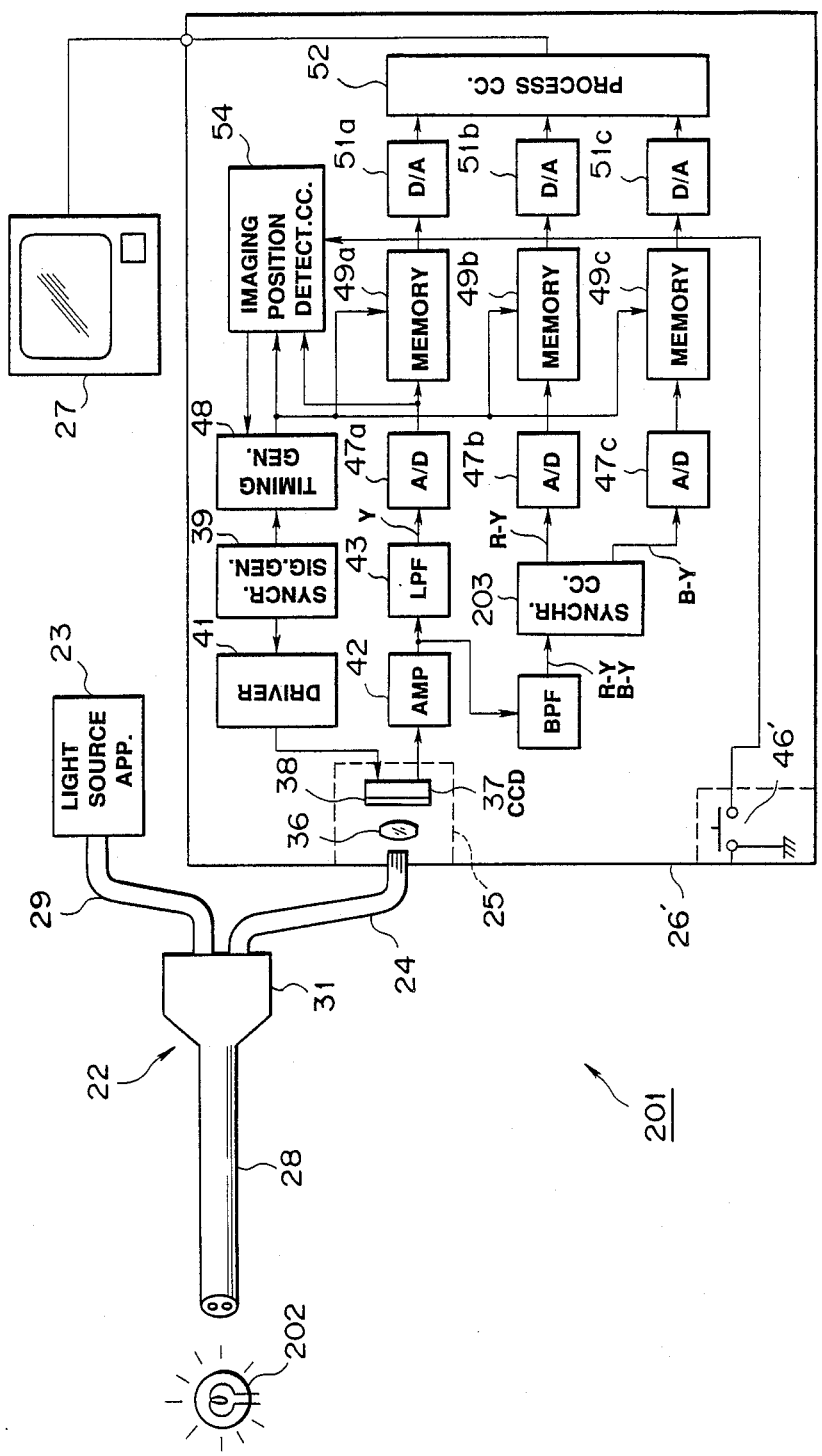
FIG. 13 is a block diagram showing the formation of an electronic endoscope apparatus of the fifth embodiment of the present invention.

FIG. 13 shows an endoscope apparatus 201 of the fifth embodiment of the present invention.

In the above described respective embodiments, the position of the image is corrected at the time of white balancing. However, in this embodiment, the position of the image is corrected with an external light.

This apparatus 201 comprises a fiber scope 22, a light source apparatus 23, a video processor apparatus 26', a color monitor 27 and a lamp 202 as an external light.

In the above mentioned video processor apparatus 26', a synchronizing circuit 203 making the line sequential color difference signals R−Y and B−Y synchronized color difference signals R−Y and B−Y is used instead of the white balancing circuit 45. An image forming position detecting operating switch 41' is provided instead of the white balancing switch 46 in the video processor apparatus 26 shown in FIG. 3 so that, when this switch 46' is on, the image forming position detecting circuit 54 may operate.

The others are of the same formation as the above mentioned first embodiment and are represented by the same reference numerals.

In this embodiment, when the switch 46' is on while the lamp 202 is lit as in the first embodiment, the center position of the image of the lamp on the exit end surface of the image guide 24 will be detected and, even when the center position of the imaging surface is relatively displaced, the address clocks read out of memories 49a, 49b and 49c will be corrected and the image of the exit end surface of the image guide 24 will be color-displayed in a predetermined displaying position on the monitor picture surface. It is preferable to arrange the lamp 202 adjacently to the objective lens 35 so that the brightness of the entire fibers of the image guide 24 may be above a predetermined level.

The above mentioned fifth embodiment shows a simultaneous type color imaging means in which the imaging part 25 has a mosaic color filter 38 but can be applied also to a frame sequential type color imaging means having no mosaic color filter 38.

The lamp 202 is used as an external light giving means. However, a mirror reflecting a light from the light source apparatus 23 may be used.

Figure 14:
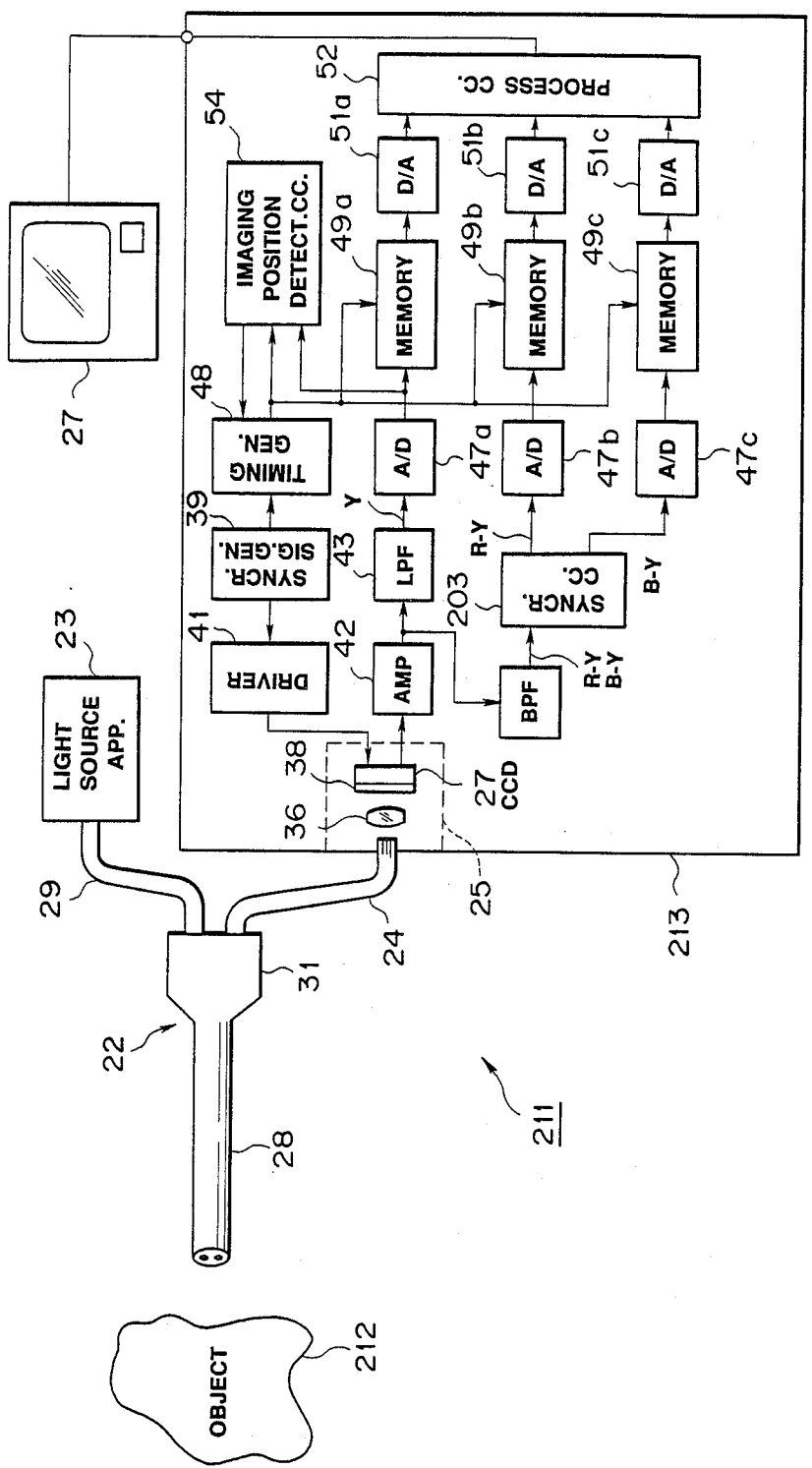
FIG. 14 is a block diagram showing the formation of an electronic endoscope apparatus of the sixth embodiment of the present invention.

FIG. 14 shows an endoscope apparatus 211 of the sixth embodiment of the present invention.

In the above described respective embodiments, at least the image displaying position is corrected before the object is observed. However, in this embodiment, the image displaying position is corrected before the object is observed. However, in this embodiment, the image displaying position is corrected in real time while the object 212 is being observed.

In the video processor apparatus 213 of this embodiment, the switch 46' is not provided and the position of the image is corrected by the analogue luminance signal Y through the A/D converter 47a in the video processor apparatus shown in FIG. 10. That is, in this embodiment, the switch 46' in the fifth embodiment is normally on and the position of the image is corrected the same as the lamp 202 and the like by the luminance of the object 212 itself. In such a case, since the object 212 generally has no dark part, the position of the image is corrected in real time by utilizing the luminance of the object 212 itself.

Even if the object 212 has a dark part, if the dark part is outside the four places (A, B, C and D in FIG. 2) used to detect the position of the image, the operation will not be obstructed.

It is apparent that this sixth embodiment can be identically applied to a frame sequential type color imaging means having no color mosaic filter 38.

In the above described respective embodiments, one of the signals (for example, made n bits) passed through the A/D converters 47a and 128 is used as an image forming position detecting signal to determine whether that signal is "H" (that is, above a fixed level) or "L" (that is, below a fixed level).

However, the present invention is not limited to this. For example, instead of inputting the output of the A/D converter 47d in FIG. 14 into the image forming position detecting circuit 54, as shown in FIG. 15, the output signal Y of the LPF 43 may be input into the comparator 151 and the output signal compared with the reference voltage Es may be input into the image forming position detecting circuit 54.

Also, in the above described respective embodiments, the address (that is, the horizontal address) of the horizontal signal period in which the signal first becomes "0" from "1" and the address (that is, the vertical address) of the horizontal signal period in which the signal last becomes "0" from "1" are added together and are multiplied by ½ to determine the center of the image forming position in the vertical direction. The timing at which the signal first becomes "1" from "0" in the horizontal signal period of this center and the timing at which the signal becomes "0" from "1" are added together and are divided by ½ to determine the center of the image forming position in the horizontal direction.

When determining the above mentioned image forming position in the vertical direction, instead of determining the horizontal signal period in which the signal first becomes "1" from "0", even if the horizontal signal period in which the signal becomes "0" from "0" is determined, there may be substantially little change. That is to say, at the point A in FIG. 2, signal becomes "1" from "0" and immediately becomes "0" from "1" and therefore there is substantially little change.

In the same manner, even at point B in FIG. 2, the time at which the signal becomes "0" from "1" and the time at which the signal becomes "1" from "0" are substantially the same and therefore, in most cases, the center may be detected by either. Also, the horizontal signal period in which the signal becomes "1" from "0" and further becomes "0" from "1" may be detected.

Generally, a montage picture surface is horizontally long. When a circular image is to be displayed on such a montage picture surface, particularly, if the displaying position is displaced in the vertical direction, the image will likely partly missing. However, even if the position is displaced more or less in the horizontal direction, there may be no problem. Therefore, in such a case, the displaying position may very well be corrected only in the vertical direction.

Without detecting the position in the horizontal direction for the horizontal signal period of the center as in the above described respective embodiments, for detecting the position in the vertical direction, the center position of the image in the horizontal direction may be simultaneously detected. This embodiment is shown in FIG. 16.

Figure 16:
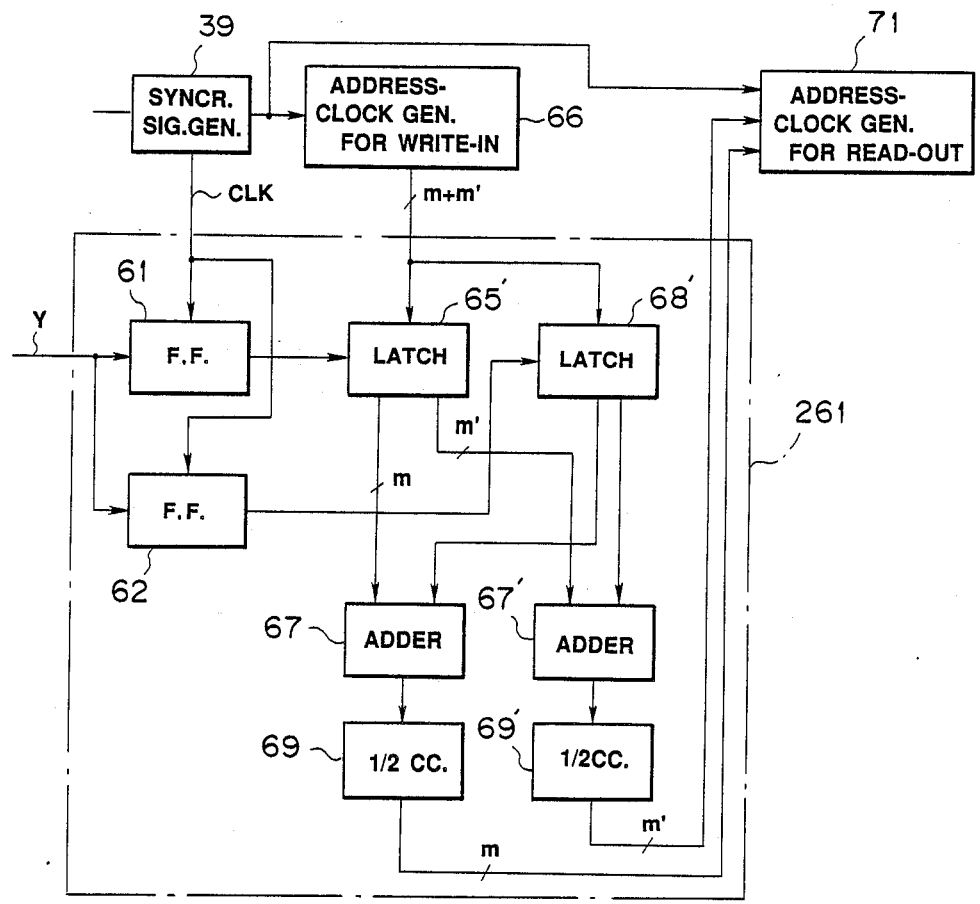
FIG. 16 is a block diagram showing another embodiment of an image forming position detecting circuit.

The image forming position detecting circuit 261 shown in FIG. 16 is similar in formation to the position detecting part in the vertical direction in FIG. 4.

The main difference is that, in FIG. 4, the latches 65 and 68 hold the addresses (for example, m bits) of the number of pixels (the number of all horizontal signal lines) in the vertical direction, whereas, in FIG. 16, the latches 65' and 68' hold the addresses (which shall be m' bits) corresponding to the number of pixels in the horizontal direction, that is, hold respectively the data of m+m' bits. The data relating to the vertical direction of the m bits are added in the adder 67 and are made ½ in the ½-circuit 69 to determine the center position (center address) in the vertical direction. On the other hand, the data relating to the horizontal direction of the m' bits are added in the adder 67' and are made ½ in the ½ circuit 69' to determine the center position in the horizontal direction.

The output signals of these ½-circuits 69 and 69' are input the reading-out address generating circuit 71.

The image guide may be formed not only of a fiber bundle but also of a relay optical system or the like.

Different embodiments may be formed by partly combining the above described respective embodiments.

What is claimed is:

1. An electronic endoscope apparatus comprising:
   a fiber scope formed of:
   an elongate insertable part,
   a light guide means inserted through said insertable part, for transmitting an illuminating light and for emitting the illuminating light from an exit end surface,
   an objective optical system arranged on a tip side of said insertable part, and
   an image transmitting means having an entrance end surface arranged in a focal plane of said objective optical system and for transmitting an optical image;
   a light source apparatus feeding an illuminating light to an entrance end surface of said light guide means;
   an imaging unit formed of:
   an imaging forming optical system fitted with said image transmitting means at an exit end and forming the optical image transmitted to said exit end, and
   an imaging device photoelectrically converting the optical image formed by said image forming optical system;
   a drive signal producing means, outputting a driving signal, for reading out a photoelectrically converted picture image signal to said imaging device;
   a signal processing means for processing said picture image signal to produce a standard video signal;
   a display means for displaying said standard video signal;
   an image forming position detecting means for detecting a signal period in which a signal corresponding to the picture image signal read linearly out of said imaging device first exceeds a fixed level, a signal period in which said signal is first below the fixed level, a signal period in which said signal last exceeds the fixed level or a signal period in which said signal is last below the fixed level, to detect an image forming position in at least one direction of an optical image imaged by said imaging device; and
   a display position correcting means for correcting an output timing of the standard video signal output from said signal processing means based upon an output signal from said image forming position detecting means and for displaying the standard video signal in a predetermined position of said displaying means.

2. An electronic endoscope apparatus according to claim 1 wherein said image forming position detecting means has a vertical direction picture image center position detecting means comprising a vertical picture image period detecting part of a first horizontal picture image signal period in which a signal corresponding to said picture image signal read horizontally linearly out of a horizontal driving signal output from said driving signal producing means to said imaging device exceeds a fixed level and a last horizontal picture image signal period in which said signal last becomes below the fixed level and an average value making circuit determining an average value between said first horizontal picture image signal period and said last horizontal picture image signal period.

3. An electronic endoscope apparatus according to claim 2 wherein said image forming position detecting means further has a horizontal direction picture image center position detecting means comprising a horizontal picture image range detecting part detecting a timing of the picture image signal first exceeding the fixed level and a timing of the picture image signal being last below the fixed level for the horizontal picture image signal in a central horizontal picture image signal period calculated by said average value making circuit and an average value making circuit determining an average value of these two timings.

4. An electronic endoscope apparatus according to any one of claims 1, 2 and 3 wherein said imaging unit has a color separating color filter in front of an imaging surface of said imaging device.

5. An electronic endoscope apparatus according to any one of claims 1, 2 and 3 wherein said imaging unit is not provided with a color separating color filter in front of an imaging surface of said imaging device.

6. An electronic endoscope apparatus according to claim 4 wherein said light source apparatus outputs a white color light.

7. An electronic endoscope apparatus according to claim 5 wherein said light source apparatus sequentially outputs a plurality of color light respectively different in wavelength.

8. An electronic endoscope apparatus according to claim 4 wherein said displaying position correcting means varies with a synchronous signal a timing of a writing-in/reading-out address signal for a memory temporarily storing the picture image signal of said imaging device based upon the output signal from said image forming position correcting means.

9. An electronic endoscope apparatus according to claim 8 wherein said image forming position correcting means detects said image forming position for a signal passed through a luminance signal reproducing circuit extracting a luminance signal component for said picture image signal read out of said imaging device.

10. An electronic endoscope apparatus according to claim 7 wherein said image forming position correcting means detects said image forming position for the picture image signal output from said imaging device under illumination of one of said plurality of color light.

11. An electronic endoscope apparatus according to claim 4 wherein said image transmitting means is an image guide having a function of transmitting an optical image formed on the entrance end surface to the other end surface and formed of a fiber bundle.

12. An electronic endoscope apparatus according to claim 11 wherein said image transmitting means further has an eyepiece lens as opposed to said other end surface of said image guide.

13. An electronic endoscope apparatus according to any one of claims 1, 2 and 3 wherein said signal processing means has a white balancing circuit for white balancing.

14. An electronic endoscope apparatus according to any one of claims 1, 2 and 3 wherein said image forming position detecting means has a switch for the image forming position detecting operation.

15. An electronic endoscope apparatus according to claim 13 wherein said image forming position detecting means has a switch operating to detect the image forming position as operatively connected with an operation of said white balancing circuit.

16. An electronic endoscope apparatus according to claim 5 wherein said displaying position correcting means varies with a synchronous signal a timing of a writing-in/reading out address signal for a memory temporarily storing the picture image signal of said imaging device based upon the output signal from said image forming position correcting means.

17. An electronic endoscope apparatus according to claim 16 wherein said image forming position correcting means detects said image forming position for a signal passed through a luminance signal reproducing circuit extracting a luminance signal component for said picture image signal read out of said imaging device.

18. An electronic endoscope apparatus according to claim 5 wherein said image transmitting means is an image guide having a function of transmitting an optical image formed on an entrance end surface to the other end surface and formed of a fiber bundle.

19. An electronic endoscope apparatus according to claim 18 wherein said image transmitting means further has an eyepiece lens as opposed to said other end surface of said image guide.

20. An electronic endoscope apparatus comprising:
a fiber scope formed of:
an elongate insertable part,
a light guide means inserted through said insertable part, for transmitting an illuminating light and for emitting the illuminating light from an exit end surface,
an objective optical system arranged on a tip side of said insertable part, and
an image transmitting means having an entrance end surface arranged in a focal plane of said objective optical system and for transmitting an optical image;
a light source apparatus feeding an illuminating light to an entrance end surface of said light guide means;
an imaging unit formed of:
an imaging forming optical system fitted with said image transmitting means at an exit end and forming the optical image transmitted to said exit end, and
an imaging device photoelectrically converting the optical image formed by said image forming optical system;
a drive signal producing means, outputting a driving signal, for reading out a photoelectrically converted picture image signal to said imaging device;
a signal processing means for processing said picture image signal to produce a standard video signal;
a display means for displaying said standard video signal;
an image forming position detecting means for detecting, in the picture image signal read linearly out of said imaging device, a signal first exceeding a fixed level/a timing at which said signal is first below the fixed level and a signal last exceeding the fixed level/a timing at which said signal is last below the fixed level, to detect an image forming position in at least one direction of an optical image imaged by said imaging device; and
a moving means for moving one of said exit end of said image transmitting means and said imaging device to the other based upon an output signal from said image forming position detecting means to display the standard video signal output from said signal processing means in a predetermined position of said displaying means.

21. An electronic endoscope apparatus comprising:
a fiber scope formed of:
an elongate insertable part,
a light guide means inserted through said insertable part, for transmitting an illuminating light and for emitting the illuminating light from an exit end surface,
an objective optical system arranged on a tip side of said insertable part, and
an image transmitting means having an entrance end surface arranged in a focal plane of said objective optical system and for transmitting an optical image;
a light source apparatus feeding an illuminating light to an entrance end surface of said light guide means;
an imaging unit formed of:
an imaging forming optical system fitted with said image transmitting means at an exit end and forming the optical image transmitted to said exit end, and
an imaging device photoelectrically converting the optical image formed by said image forming optical system;
a drive signal producing means, outputting a driving signal, for reading out a photoelectrically converted picture image signal to said imaging device;
a signal processing means for processing said picture image signal to produce a standard video signal;
a display means for displaying said standard video signal;
an image forming range detecting means for detecting a timing at which a signal corresponding to the picture image signal read linearly out of said imaging device is first above/below a fixed level and a timing at which said signal is last above/below the fixed level, to detect an image forming range of the optical image imaged by said imaging device; and
a displaying position correcting means correcting a displaying position so that the video signal displayed on said displaying means may be in a predetermined position based upon an output signal from said image forming range detecting means.

22. An electronic endoscope apparatus according to claim 20 or 21 wherein said imaging unit has a color separating color filter in front of an imaging surface of said imaging device.

23. An electronic endoscope apparatus according to claim 20 or 21 wherein said imaging unit is not provided with a color separating color filter in front of an imaging surface of said imaging device.

24. An electronic endoscope apparatus according to claim 20 or 21 wherein said displaying position correcting means varies with a synchronous signal a timing of the writing-in / reading-out address signal in a memory temporarily storing the picture image signal of said imaging device based upon the output signal from said image forming position correcting means.

25. An electronic endoscope apparatus according to claim 24 wherein said image forming position correcting means detects said image forming position for a signal passed through a luminance signal reproducing circuit extracting a luminance signal component from said picture image signal read out of said imaging device.

* * * * *